US010564648B2

(12) United States Patent
Hein

(10) Patent No.: US 10,564,648 B2
(45) Date of Patent: Feb. 18, 2020

(54) HIGH-AUTHORITY YAW CONTROL FOR A TANDEM VEHICLE WITH RIGID ROTORS

(71) Applicant: SIKORSKY AIRCRAFT CORPORATION, Stratford, CT (US)

(72) Inventor: Benjamin Reed Hein, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 287 days.

(21) Appl. No.: 15/525,738

(22) PCT Filed: Nov. 10, 2015

(86) PCT No.: PCT/US2015/059872
§ 371 (c)(1),
(2) Date: May 10, 2017

(87) PCT Pub. No.: WO2016/077297
PCT Pub. Date: May 19, 2016

(65) Prior Publication Data
US 2017/0336809 A1 Nov. 23, 2017

Related U.S. Application Data

(60) Provisional application No. 62/078,654, filed on Nov. 12, 2014.

(51) Int. Cl.
G05D 1/08 (2006.01)
B64C 29/02 (2006.01)

(52) U.S. Cl.
CPC .......... G05D 1/0858 (2013.01); B64C 29/02 (2013.01)

(58) Field of Classification Search
CPC ............... B64C 29/02; G05D 1/0858
See application file for complete search history.

(56) References Cited

U.S. PATENT DOCUMENTS

| 2,835,456 | A | 5/1958 | Kaplan |
| 3,514,052 | A | 5/1970 | McKeown |
| 5,765,783 | A | 6/1998 | Albion |
| 7,264,199 | B2 | 9/2007 | Zientek |
| 8,128,034 | B2 | 3/2012 | Karem |
| 2002/0109044 | A1 | 8/2002 | Rock |
| 2005/0178879 | A1 | 8/2005 | Mao |

(Continued)

FOREIGN PATENT DOCUMENTS

GB 617290 A 2/1949

OTHER PUBLICATIONS

Notification of Transmittal of the International Search Report for International Application No. PCT/US15/59872 dated Mar. 9, 2016; dated Mar. 17, 2016; 9 pages.

(Continued)

Primary Examiner — Claude J Brown
(74) Attorney, Agent, or Firm — Cantor Colburn LLP

(57) ABSTRACT

A method for executing yaw control of an aircraft including two rotors is provided. The method includes inducing helicopter yaw by creating a differential torque between the two rotors, wherein the creating of the differential torque comprises inducing a differential collective pitch to generate a differential thrust, and maintaining helicopter roll equilibrium during the inducing of the helicopter yaw by inducing a differential cyclic pitch to generate a differential lift offset.

15 Claims, 4 Drawing Sheets

(56) References Cited

U.S. PATENT DOCUMENTS

2013/0311008 A1 11/2013 Kroo
2014/0034774 A1 2/2014 Ferrier et al.

OTHER PUBLICATIONS

Written Opinion of the International Searching Authority for International Application No. PCT/US15/59872 dated Mar. 9, 2016; dated Mar. 17, 2016; 6 pages.
Extended European Search Report; European Application No. 15858679.2; dated Jun. 14, 2018; 10 Pages.

HIGH-AUTHORITY YAW CONTROL FOR A TANDEM VEHICLE WITH RIGID ROTORS

CROSS REFERENCE TO RELATED APPLICATIONS

This application is a National Stage application of PCT/US2015/059872, filed Nov. 10, 2015, which claims the benefit of U.S. Provisional Application No. 62/078,654, filed Nov. 12, 2014, both of which are incorporated by reference in their entirety herein.

BACKGROUND

The subject matter disclosed herein relates generally to the field of tandem rotor aircraft and, to a system and method to provide high-authority yaw control to a tandem rigid rotor aircraft.

DESCRIPTION OF RELATED ART

A conventional tandem rotor helicopter has horizontal main rotor assemblies mounted at a distance from the aircraft center-of-gravity and requires articulated rotors to maintain yaw control. Articulated rotors have flapping hinges that allow the aircraft to tilt the direction of thrust in any direction through rotor blade flapping, whereas flapping is vertical motion of the rotor blade. In aircraft with tandem articulated rotors, differential thrust vectoring is used to create a yaw moment or essentially a pirouetting motion of the aircraft. These articulated rotors tilt the direction of thrust in any direction independent of the airframe orientation. As a result, the tip path plane can be modulated through flapping of the rotor blades alone, which allows the aircraft to change the thrust direction without affecting total thrust or the sharing of thrust between the two rotors.

A tandem rotor helicopter with a rotor system rigid-in-flap cannot take advantage of tilting the thrust direction, but can create large control moments, which are advantageous in other flight regimes. One such method of yaw control for an exemplary tandem, rigid rotor helicopter, such as a "tail-sitter" aircraft, utilizes rpm change of the rotors to produce a torque change at the aircraft level during take-off and hover. This torque change results in yaw control moments for the tail-sitter aircraft. However, tandem aircraft with rigid rotors cannot use differential thrust alone to provide yaw control since the asymmetry in thrust between the two rotors with respect to the center of gravity will create a large uncontrolled moment. This moment prevents the aircraft from maintaining a level attitude. A method to provide yaw control for rigid rotor tandem aircraft configurations while maintaining equilibrium in roll, pitch, yaw and thrust would be well received in the art.

BRIEF SUMMARY

According to an aspect of the invention, a method for executing yaw control of an aircraft including two rotors is provided. The method includes inducing helicopter yaw by creating a differential torque between the two rotors, wherein the creating of the differential torque comprises inducing a differential collective pitch to generate a differential thrust, and maintaining helicopter roll equilibrium during the inducing of the helicopter yaw by inducing a differential cyclic pitch to generate a differential lift offset.

In accordance with additional or alternative embodiments, each of the two rotors includes a rigid rotor.

In accordance with additional or alternative embodiments, the method further includes inducing the differential collective pitch and the differential cyclic pitch at each of the two rotors.

In accordance with additional or alternative embodiments, the aircraft includes a fuselage having leading and trailing ends at which the two rotors are respectively disposed.

In accordance with additional or alternative embodiments, the helicopter yaw is defined about a vertical axis.

In accordance with additional or alternative embodiments, the helicopter roll equilibrium is defined along a longitudinal axis of the fuselage.

In accordance with additional or alternative embodiments, the aircraft includes a fuselage with wings extending outwardly from opposite sides of the fuselage, the two rotors being respectively disposed at the wings.

In accordance with additional or alternative embodiments, the helicopter yaw is defined about a vertical axis.

In accordance with additional or alternative embodiments, the helicopter roll equilibrium is defined transversely relative to a longitudinal axis of the fuselage.

According to another aspect of the invention, an aircraft is provided and includes a fuselage, first and second rotors disposed to rotate with respect to the fuselage to generate lift and thrust, a control system coupled to the first and second rotors and configured to induce helicopter yaw by creating a differential torque between the two rotors. The creating of the differential torque by the control system includes inducing at the control system a differential collective pitch to generate a differential thrust, the control system being further configured to maintain helicopter roll equilibrium during the inducing of the helicopter yaw by inducement of a differential cyclic pitch to generate a differential lift offset.

In accordance with additional or alternative embodiments, each of the two rotors comprises a rigid rotor.

In accordance with additional or alternative embodiments, the first and second rotors are respectively disposed at leading and trailing ends of the fuselage.

In accordance with additional or alternative embodiments, the helicopter yaw is defined about a vertical axis and the helicopter roll equilibrium is defined along a longitudinal axis of the fuselage.

In accordance with additional or alternative embodiments, the first and second rotors are respectively disposed at wings extending outwardly from opposite sides of the fuselage.

In accordance with additional or alternative embodiments, the helicopter yaw is defined about a vertical axis and the helicopter roll equilibrium is defined transversely relative to a longitudinal axis of the fuselage.

Technical function of the one or more features described above include a vehicle control system in a tandem-rigid-rotor aircraft that enables a high-authority, uncoupled yaw control without a vehicle or rotor tip-path plane motion. Using individual-rotor lift-offset control in the axis containing both rotor systems and the aircraft center of gravity, torque of each rotor can be controlled while maintaining control of the roll moment along the orthogonal axis.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Embodiments of a system and method for a mixing algorithm in a tandem aircraft with rigid rotors utilizes differential thrust via collective blade pitch in order to produce a net torque difference between the rigid rotors. To produce a torque-induced yaw moment, thrust between rotors is varied and applied at an offset from rotor shaft axes, thereby controlling the center of lift with respect to the center of gravity and net yaw moment of the aircraft.

Figure 1:
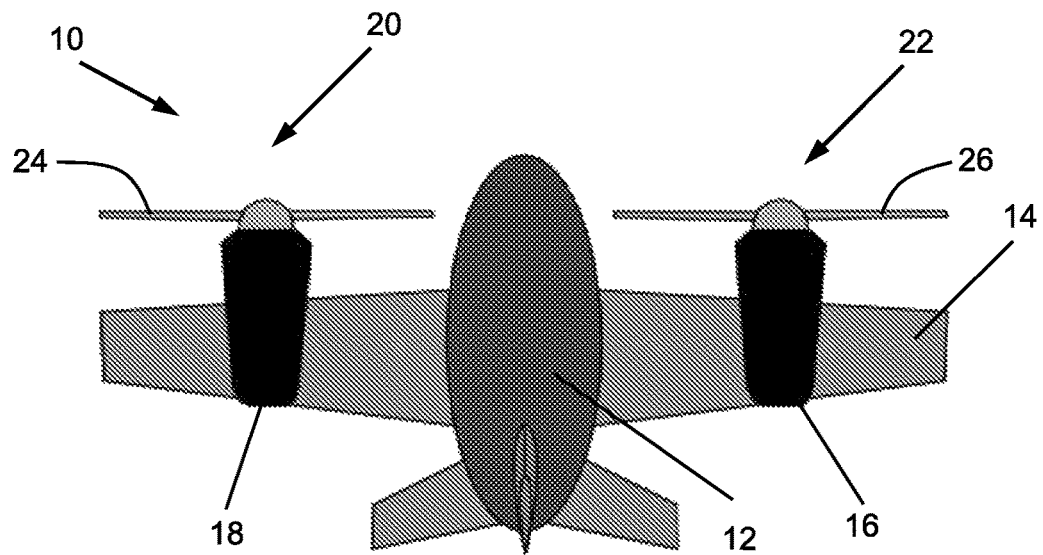
FIG. 1 is a schematic view of an exemplary tail-sitter aircraft in accordance with an embodiment of the invention.

Referring now to the drawings, FIG. 1 illustrates a schematic view of an exemplary vehicle in the form of a tail-sitter aircraft 10 for implementing a mixing algorithm in accordance with an embodiment of the invention. As illustrated, tail-sitter aircraft 10 is shown oriented in a vertical take-off and landing mode whereby the fuselage 12 longitudinal axis is vertically oriented with respect to the ground during takeoff and landing. In this orientation (which was chosen for simplicity of explanation but is not required), tail sitter aircraft 10 has a tandem rotor configuration in these flight states. Tail-sitter aircraft 10 may, but is not required to, include a fuselage 12 that is located in the middle of a wing structure 14. A plurality of propellers 16 and 18 are mounted to wing structure 14 and includes respective rigid rotors 20 and 22. The rigid rotors 20 and 22 have a plurality of rotor blades 24 and 26, respectively. The plurality of rotor blades 24 and 26 rotate to provide thrust during takeoff and landing and during horizontal flight. Elongated wing structure 14 is configured to provide lift when the tail-sitter aircraft 10 is in horizontal flight (i.e., wing-borne flight state).

Figure 2:
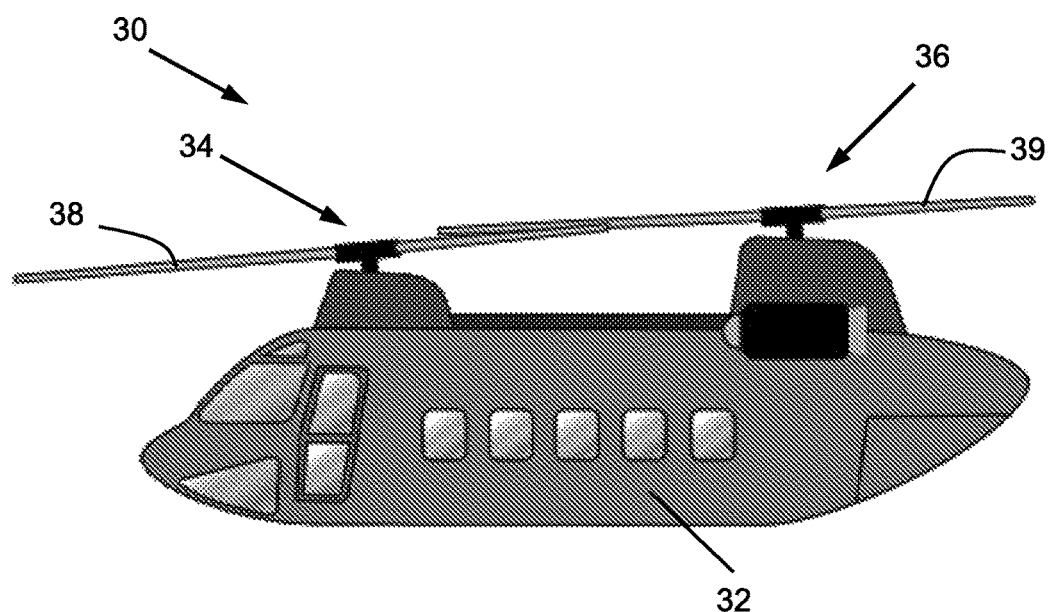
FIG. 2 is a schematic view of a tandem rotor aircraft in accordance with an embodiment of the invention.

FIG. 2 illustrates a schematic view of another embodiment of a tandem rotor aircraft 30 having rigid rotors that implements high-authority differential yaw control. Aircraft 30 includes a fuselage 32 and rotor assemblies 34 and 36 that are mounted to the fuselage 32 in a tandem configuration. Each rotor 34 and 36 is a rigid rotor that has a plurality of rotor blades 38 and 39, respectively. The plurality of rotor blades 38 and 39 rotate to provide lift to aircraft 30. Each rigid rotor rotates in an opposite direction to maintain equilibrium in pitch, roll, yaw moments, and lift forces. Although tandem rotor aircraft 30 is illustrated with two rotors 34 and 36 mounted one behind the other, additional rotors that are substantially similar to rotors 34 and 36 are also contemplated for use within the scope of the invention.

While a particular configuration of a tail-sitter aircraft 10 is illustrated and described in the disclosed embodiments, it is to be appreciated that other rigid rotors and/or machines with a tandem rotor configuration that may operate over land or over water including fixed-wing aircraft, tail-sitting ducted fan vertical take-off and landing (VTOL) aircraft, including micro or organic air-vehicles may also benefit from embodiments disclosed.

Figure 3:
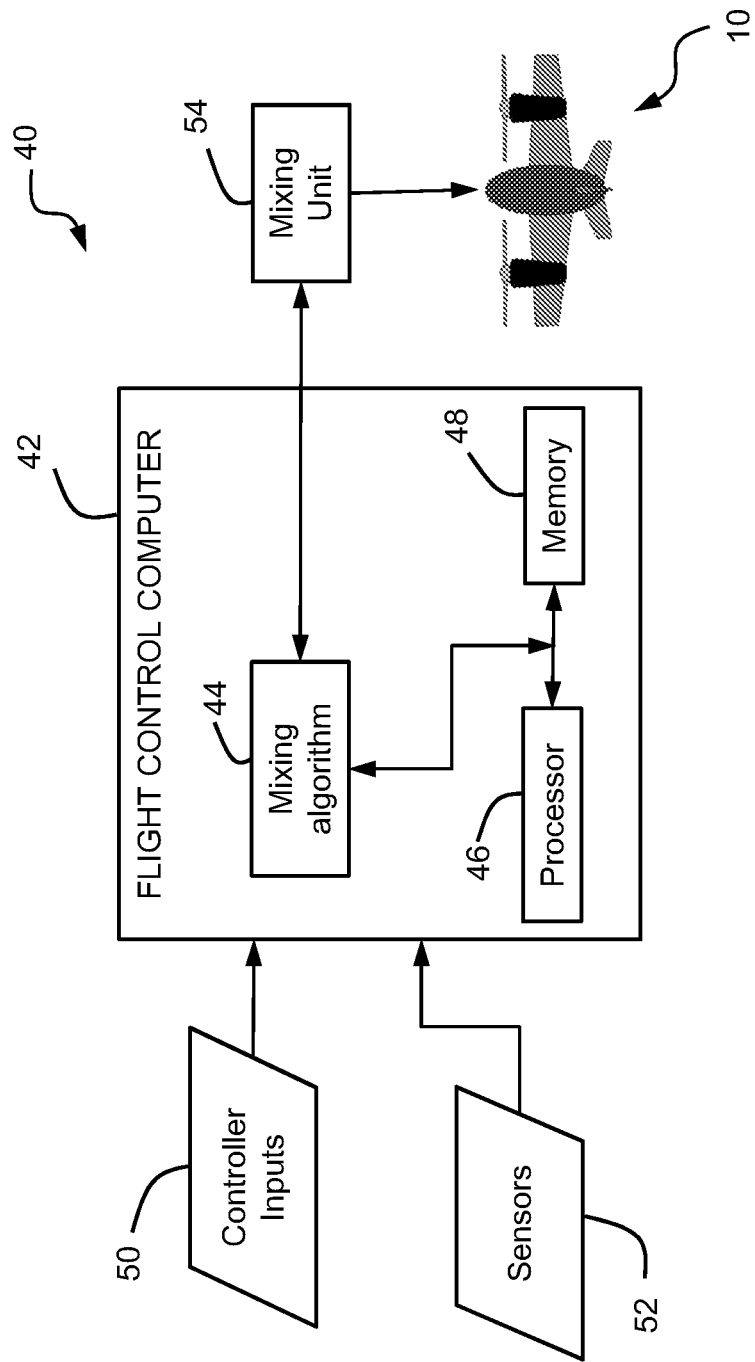
FIG. 3 is a schematic view of an exemplary control system in accordance with an embodiment of the invention.

FIG. 3 illustrates a schematic block diagram of a control system 40 in aircraft 10 for implementing embodiments of the invention. As illustrated, control system 40 implements mixing algorithm 44 for mixing torque/yaw moments and rolling moments on aircraft 10 based on thrust and lift-offset commands. Mixing algorithm 44 shapes the pilot's controller and displacement commands in order to provide varied thrust and lift-offset commands based on the collective rotor blade pitch and the cyclic rotor blade pitch on the rotors 20 and 22 (FIG. 1). In an embodiment, control system 40 includes a computing system such as a flight control computer (FCC) 42. The FCC 42 can receive reference commands from a controller 50 such as, e.g., a collective and cyclic stick, and sensed parameter signals from a plurality of sensors 52 including operating conditions such as yaw (which is defined about a vertical axis), pitch and roll (which is defined along or transversely to a longitudinal axis of the fuselage) rotational acceleration, attitude, and directional acceleration as well as magnitude and direction of wind speed relative to the rotors 20 and 22 in aircraft 10 in order to produce the desired stability response and flight augmentation.

In an embodiment, the FCC 42 receives sensor signals from sensors 52 that relate to rotational accelerations and produces collective and cyclic pitch commands to a mixing unit 54. In addition, FCC 42 may receive feedback signals from sensors 52 as torque values on rotor shafts of rotors 20 and 22 (FIG. 1) in order to determine the torque applied and determine adjustment solutions for adjusting the thrust values on rotors 20 and 22 in order to produce a desired differential torque between rotors 20 and 22 (FIG. 1) and yaw control for aircraft 10. Mixing unit 54 produces collective and cyclic blade pitch commands on rotors 20 and 22 (FIG. 1) in order to create or correct aircraft attitude states. Also shown in FIG. 3, FCC 42 includes a memory 48. The memory 48 stores mixing algorithm 44 as executable instructions that is executed by processor 46. The executable instructions may be stored or organized in any manner and at any level of abstraction, such as in connection with the execution of mixing algorithm 44. Processor 46 may be any type of processor, for example, a central processing unit (CPU) or a graphics processing unit (GPU), including a general purpose processor, a digital signal processor, a microcontroller, an application specific integrated circuit (ASIC), a field programmable gate array (FPGA), or the like. Also, in embodiments, memory 48 may include random access memory (RAM), read only memory (ROM), or other electronic, optical, magnetic, or any other computer readable medium onto which is stored mixing algorithm 44 described below with reference to FIGS. 4 and 5. It is to be appreciated that mixing algorithm 44 described below may be implemented not only on tail-sitter aircraft 10 with rigid rotors but also for any aircraft that has rigid rotors arranged in a tandem rotor configuration.

Figure 4:
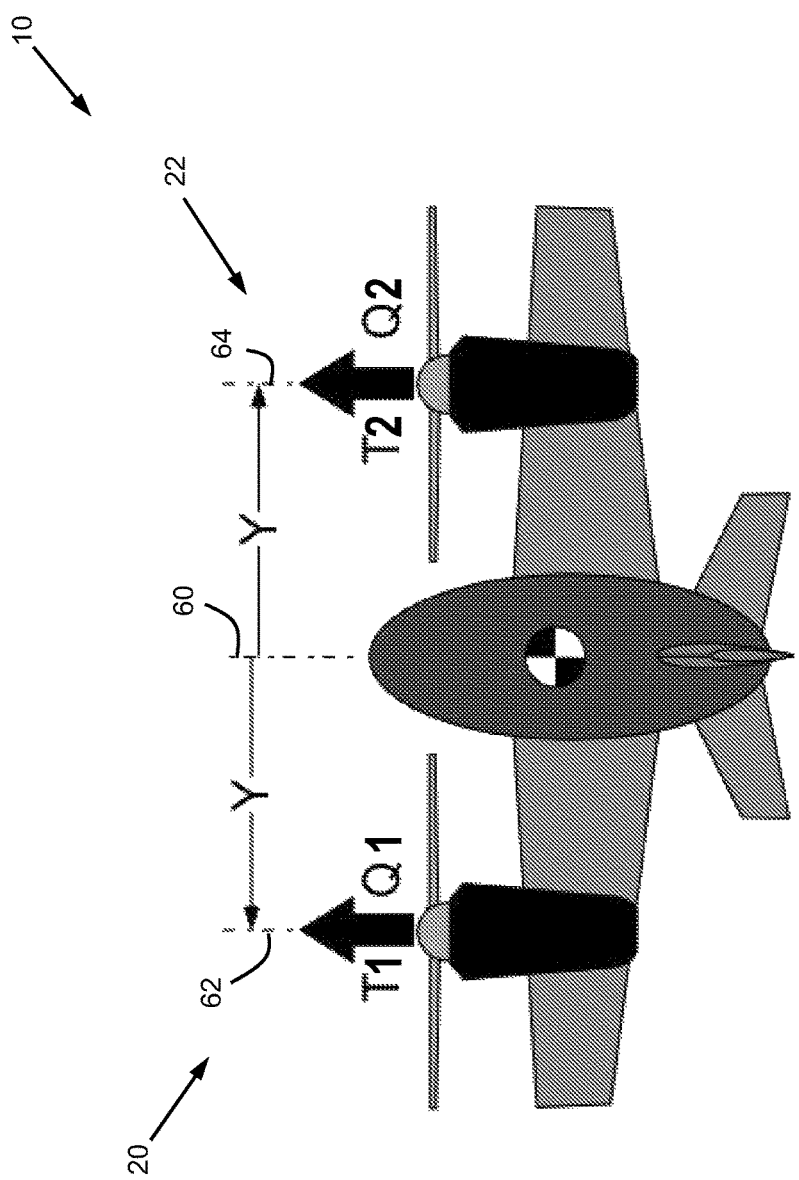
FIG. 4 is a schematic view of an exemplary aircraft that is shown in an equilibrium state in accordance with an embodiment of the invention.
Figure 5:
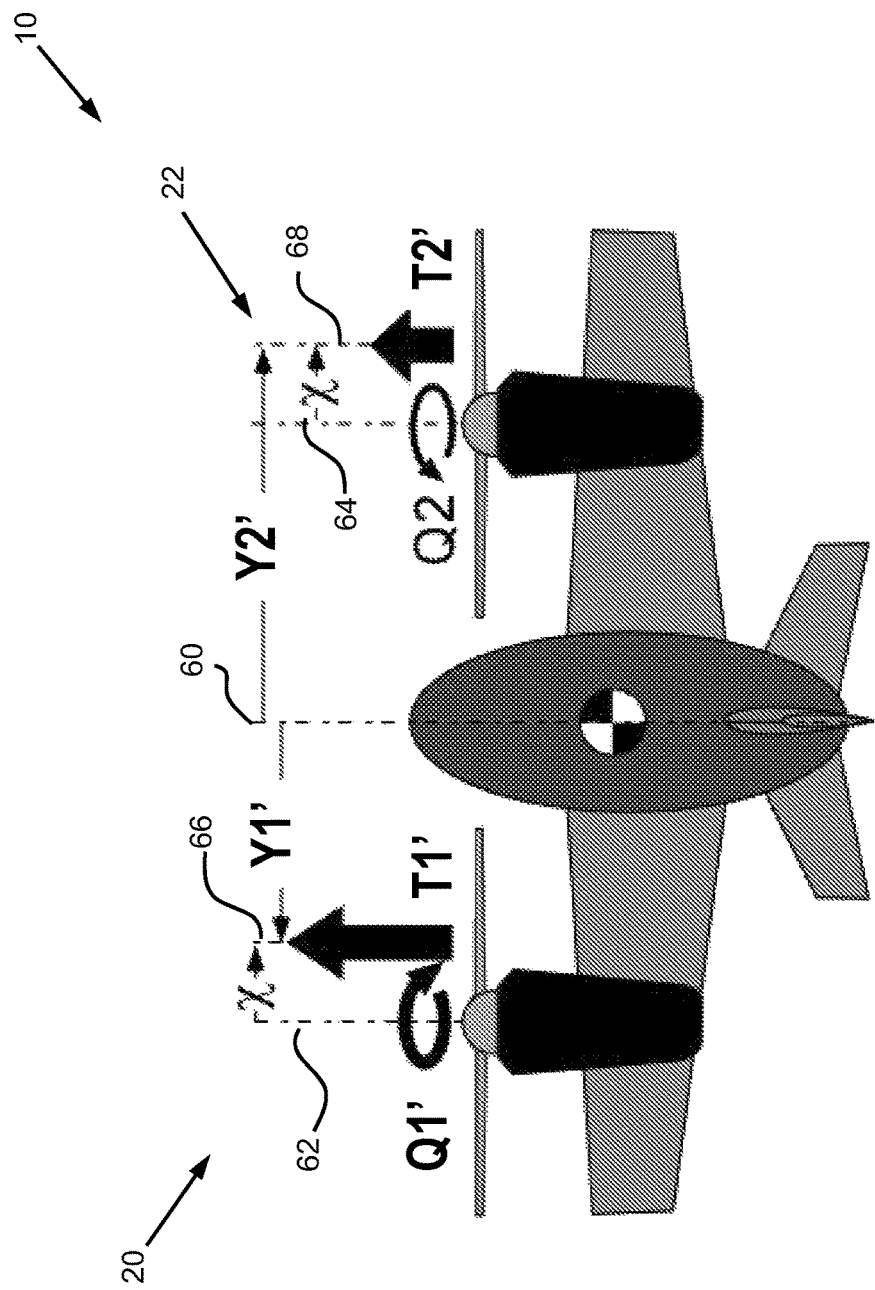
FIG. 5 is a schematic view of an exemplary aircraft in equilibrium with a non-zero yaw torque that is implementing a mixing algorithm in accordance with an embodiment of the invention.

FIGS. 4 and 5 depict an exemplary aircraft with rigid rotors that are used to implement mixing algorithm 44 (FIG. 3) according to an embodiment of the invention. Referring to FIG. 4, torque Q on rotor shafts of rotors 20 and 22 is a function of thrust T and weight according to the following equations:

$$P = \frac{kT^{3/2}}{\sqrt{2PA}} + \frac{\sigma Cd0}{8} \tag{1}$$

$$Q = \frac{P}{\Omega} \qquad (2)$$

$$Q = fcn(T^{3/2}) \qquad (3)$$

Where:
Q=Torque;
P=Power;
$\Omega$=Rotor rotation speed in radians per second; and
T=Thrust.

In an equilibrium state, as shown in FIG. 4, thrust T1 is applied along shaft axis 62, and thrust T2 is applied along shaft axis 64. Shaft axes 62 and 64 are at a distance Y from center axis 60 of aircraft 10. Center axis 60 represents a center of gravity of aircraft 10 in the tandem rotor configuration. As thrust T1 is equal to Thrust T2, this produces a center of lift substantially along center axis 60. Applying equations (1), (2) and (3) above, the product of T1 and Y1 is equal to the product of T2 and Y2, which makes torque Q1 equal to torque Q2. This results in a net torque $\Delta\Omega$=0 and a zero net yaw moment on rotors 20 and 22.

As shown in FIG. 5, mixing algorithm 44 (FIG. 3) utilizes the torques Q1' and Q2' on rotors 20 and 22 in order to produce a differential torque moment and therefore net aircraft 10 yaw moment. The differential thrust levels T1' and T2' produces respective differential torque levels Q1' and Q2' at rotors 20 and 22. For example, increasing thrust T1' with respect to T2' creates an increased torque Q1' with respect to torque Q2'. Since each rotor is rotating in opposite directions, a differential torque Q1' and Q2' creates a delta torque (i.e., non-zero torque) which creates a delta yaw moment (i.e., non-zero yaw moment) to produce a pirouetting motion for aircraft 10.

This delta yaw moment can be expressed as follows:

$$\Delta Q = \left(\frac{-W}{2y}\right)^{3/2} \times \frac{1}{\Omega\sqrt{2PA}} \times [(y+x)^{3/2} - (y-x)^{3/2}] \qquad (4)$$

Where:
For zero roll moment, T1'Y1'=T2'Y2', and
For zero thrust change, W=T1'+T2'.

Feedback signals from sensors 52 (FIG. 2) may receive torque values Q1' and Q2' to determine the torque applied and adjustment solutions for adjusting thrust values T1' and T2' to produce a desired differential torque between rotors 20 and 22 and yaw control for aircraft 10. To produce a yaw moment, mixing algorithm 44 (FIG. 3) modulates thrust T1' and T2' (varies thrust) between rotors 20 and 22 by applying differential collective pitch on the rotor blades 24 and 26 (FIG. 1) of rotors 20 and 22 (FIG. 1), respectively. To compensate for the variation in roll moment around the aircraft center of gravity, on axis 60, due to the difference between thrust forces T1' and T2' on rotors 20 and 22, a lift offset $\chi$ proportional to the variation in thrust T1' and T2' is applied to each rotor. Thrust T1' is applied along thrust axis 66, which is at a lift offset $\chi$ from shaft axis 62. Also, thrust T2' is applied along thrust axis 68, which is at a lift offset $\chi$ from shaft axis 64. By applying thrusts T1' and T2' along axes 66 and 68 respectively, the equality of product of T1' and Y1' and the product of T2' and Y2' is maintained. Applying equations (1), (2) and (3) above, this varying thrust increases torque on one rotor and decreases torque on the other rotor causing a pirouetting motion or yaw control.

A varying thrust on respective rotors 20 and 22 can be applied at a lift offset $\chi$ through cyclic pitch control. Changing the thrust and torque, according to Equations (1), (2) and (3) above, and applying cyclic pitch to control the location of axis 66 and 68 via lift offset $\chi$ maintains rolling moments for aircraft 10 while allowing for changes in thrust levels T1' and T2' between respective rotors 20 and 22.

Thus, a method for executing yaw control of a tandem rotor helicopter including two rotors is provided and includes inducing helicopter yaw by creating a differential torque between the two rotors. Here, the creating of the differential torque includes inducing a differential collective pitch to generate a differential thrust and the method further includes maintaining helicopter roll equilibrium during the inducing of the helicopter yaw by inducing a differential cyclic pitch to generate a differential lift offset.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for executing yaw control of an aircraft including two rotors, the method comprising:
   inducing helicopter yaw by creating a differential torque between the two rotors in a flight state with tandem rotor configuration,
   wherein the creating of the differential torque comprises inducing a differential collective pitch to generate a differential thrust, and
   maintaining helicopter roll equilibrium during the inducing of the helicopter yaw by inducing a differential cyclic pitch to generate a differential lift offset, wherein the lift offset applied to each rotor is proportional to the variation in thrust applied to the rotors.

2. The method according to claim 1, wherein each of the two rotors comprises a rigid rotor.

3. The method according to claim 1, further comprising inducing the differential collective pitch and the differential cyclic pitch at each of the two rotors.

4. The method according to claim 1, wherein the aircraft comprises a fuselage having leading and trailing ends at which the two rotors are respectively disposed.

5. The method according to claim 4, wherein the helicopter yaw is defined about a vertical axis.

6. The method according to claim 4, wherein the helicopter roll equilibrium is defined along a longitudinal axis of the fuselage.

7. The method according to claim 1, wherein the aircraft comprises a fuselage with wings extending outwardly from opposite sides of the fuselage, the two rotors being respectively disposed at the wings.

8. The method according to claim 7, wherein the helicopter yaw is defined about a vertical axis.

9. The method according to claim 7, wherein the helicopter roll equilibrium is defined transversely relative to a longitudinal axis of the fuselage.

10. An aircraft, comprising:

a fuselage;

first and second rotors disposed to rotate with respect to the fuselage to generate lift and thrust;

a control system coupled to the first and second rotors and configured to induce helicopter yaw by creating a differential torque between the two rotors in a flight state with tandem rotor configuration, wherein the creating of the differential torque by the control system comprises inducing at the control system a differential collective pitch to generate a differential thrust, the control system being further configured to maintain helicopter roll equilibrium during the inducing of the helicopter yaw by inducement of a differential cyclic pitch to generate a differential lift offset wherein the lift offset applied to each rotor is proportional to the variation in thrust applied to the rotors.

11. The aircraft according to claim 10, wherein each of the two rotors comprises a rigid rotor.

12. The aircraft according to claim 10, wherein the first and second rotors are respectively disposed at leading and trailing ends of the fuselage.

13. The aircraft according to claim 12, wherein the helicopter yaw is defined about a vertical axis and the helicopter roll equilibrium is defined along a longitudinal axis of the fuselage.

14. The aircraft according to claim 10, wherein the first and second rotors are respectively disposed at wings extending outwardly from opposite sides of the fuselage.

15. The aircraft according to claim 14, wherein the helicopter yaw is defined about a vertical axis and the helicopter roll equilibrium is defined transversely relative to a longitudinal axis of the fuselage.

* * * * *